US008794182B2

(12) United States Patent
Eineren

(10) Patent No.: US 8,794,182 B2
(45) Date of Patent: Aug. 5, 2014

(54) SYSTEM AND A METHOD FOR CONTROLLING AN AUTOMATIC MILKING SYSTEM

(75) Inventor: Ellinor Eineren, Linkoping (SE)

(73) Assignee: Agricam AB, Linkoping (SE)

( * ) Notice: Subject to any disclaimer, the term of this patent is extended or adjusted under 35 U.S.C. 154(b) by 0 days.

(21) Appl. No.: 13/993,828

(22) PCT Filed: Dec. 13, 2011

(86) PCT No.: PCT/EP2011/072646
§ 371 (c)(1),
(2), (4) Date: Jul. 3, 2013

(87) PCT Pub. No.: WO2012/080275
PCT Pub. Date: Jun. 21, 2012

(65) Prior Publication Data
US 2013/0284098 A1    Oct. 31, 2013

(30) Foreign Application Priority Data
Dec. 15, 2010 (SE) ...................................... 1051329

(51) Int. Cl.
*A01J 11/00* (2006.01)
*A01J 7/04* (2006.01)

(52) U.S. Cl.
USPC ..................................... 119/14.08; 119/14.14

(58) Field of Classification Search
CPC .................................. A01J 11/00; A01J 7/04
USPC .................. 119/14.08, 14.14, 14.18; 600/474
See application file for complete search history.

(56) References Cited

U.S. PATENT DOCUMENTS

| 4,445,516 | A | * | 5/1984 | Wollnik et al. | 600/549 |
| 4,849,885 | A | * | 7/1989 | Stillwagon et al. | 600/549 |
| 4,865,044 | A | * | 9/1989 | Wallace et al. | 600/549 |
| 5,474,085 | A | * | 12/1995 | Hurnik et al. | 600/587 |
| 5,637,871 | A | * | 6/1997 | Piety et al. | 250/330 |
| 5,666,903 | A | * | 9/1997 | Bull et al. | 119/14.01 |
| 7,277,744 | B2 | | 10/2007 | Schaefer et al. | |
| 8,462,990 | B2 | * | 6/2013 | Akashi et al. | 382/108 |

FOREIGN PATENT DOCUMENTS

| EP | 0677243 A2 | 10/1995 |
| GB | 2272971 A | 6/1994 |
| GB | 2325300 A | 11/1998 |
| WO | 00/57164 A1 | 9/2000 |
| WO | 2005/094565 A1 | 10/2005 |
| WO | 2008/140407 A1 | 11/2008 |
| WO | 2009/123435 A2 | 10/2009 |
| WO | 2010/008606 A2 | 1/2010 |

* cited by examiner

*Primary Examiner* — Yvonne Abbott
(74) *Attorney, Agent, or Firm* — Hayes Soloway P.C.

(57) ABSTRACT

A system (1) for controlling an automatic milking system (2), configured for automatically receiving, identifying and selectively milking a lactating animal in accordance with a set of milking parameters associated with the animal. The system comprises a thermal imaging device (3), configured for generating at least one current thermal image of at least a portion of an udder of the animal, a storage device (4), configured for storing at least one reference thermal image of the udder, and a processing device (7), configured for comparing at least one current value derived from the at least one current thermal image and/or at least one current thermal image with at least one reference value derived from the at least one reference thermal image and/or at least one reference thermal image. The processing device is arranged to selectively provide a status indication of the animal in response to a result of the comparison.

12 Claims, 2 Drawing Sheets

SYSTEM AND A METHOD FOR CONTROLLING AN AUTOMATIC MILKING SYSTEM

TECHNICAL FIELD

The present disclosure relates to a system and a method for controlling an automatic milking system.

In particular, the present disclosure relates to a system and a method, which are capable of identifying individual animals that are at a risk of developing mastitis, and of reducing the risk of such animals actually developing mastitis.

TECHNICAL BACKGROUND

Automatic milking systems are known from e.g. WO 2009/123435 (A2).

Another automatic milking system is known from WO 2008/140407 A1.

Today's automatic milking systems cannot identify animals having a slow milking rate. Instead, such animals are recorded as being "ready" while remaining milk in the udder is prone to attract bacterial growth, which may result in mastitis.

There are two types of mastitis: clinical mastitis and subclinical mastitis.

Clinical mastitis, i.e. a fully developed inflammation, is very common, and costly to the farming business, since the productivity and milk quality of an animal having clinical mastitis is reduced and emergency slaughter often becomes necessary.

Subclinical mastitis is even more common than clinical mastitis and does not result in any change in general condition of the animal. However, subclinical mastitis also causes a drop in productivity and an increased level of cells in the milk, which may lead to a reduction of milk quality and an associated reduction in the milk price.

Today, clinical mastitis is treated with antibiotics. Subclinical mastitis is generally not treated at all.

U.S. Pat. No. 7,277,744 B2 provides a background to the concept of using infrared thermography for detecting clinical or subclinical mastitis in lactating animals. According to U.S. Pat. No. 7,277,744 B2, "[t]he successful treatment of mastitis is possible using a variety of animal management, milking hygiene and antibiotic agents."

Hence, there remains a need for an improved concept of detecting and treating mastitis in lactating animals.

SUMMARY

It is a general object to provide a system and a method, which are able to improve the health of lactating animals.

A particular object is to provide a system and a method, which address the problem of subclinical mastitis in lactating animals.

The invention is defined by the appended independent claims. Embodiments are set forth in the appended dependent claims, in the following description and in the drawings.

According to a first aspect, there is provided a system for controlling an automatic milking system, which is configured for automatically receiving, identifying and selectively milking a lactating animal in accordance with a set of milking parameters associated with said animal. The system comprises a thermal imaging device, configured for generating at least one current thermal image of at least a portion of an udder of said animal, a storage device, configured for storing at least one reference thermal image of said udder, and a processing device, configured for comparing at least one current value derived from said at least one current thermal image and/or at least one current thermal image with at least one reference value derived from said at least one reference thermal image and/or said at least one reference thermal image. The processing device is arranged to detect a temperature difference between the udder as depicted on the current thermal image and the udder as depicted on the reference thermal image.

The processing device is arranged to selectively provide a status indication of said animal in response to a result of said detection.

The term "milking parameters" is understood as a set of data, which are used to control the milking process for an individual animal. Such milking parameters may include one or more of e.g. milking duration, milking frequency, target amount of milk, vacuum level on milking and vacuum application frequency when milking.

A "thermal imaging device" is understood as a device capable of generating a digital thermal image of an area. Thermal imaging is also known as "thermography" or "infrared thermography".

The expression "selectively milking" an animal is understood to mean that the animal is milked if a milking criterion of that animal is met in view of, e.g. a set of milking parameters associated with that animal. Hence, if the milking criterion is not met, the animal is rejected and no milking will take place.

The term "value derived" should be understood as any value derivable based on an image. Hence, the value may be a single value, such as a maximum temperature or a plurality of values, such as an entire image.

The "status indication" may e.g. be a signal to another part of the system, causing it to take some action, or a signal to an operator, calling the operator's attention to the result of the comparison. For example, it may be indicated that the result of the comparison is indicative of an increased risk of a health issue, such as subclinical or clinical mastitis.

The processing and storage devices may be in the form of one or more processing and storage devices, respectively. While it is conceivable to integrate all functions in the control system of the automatic milking system, it is also possible to provide a separate processing device for all or part of the thermal imaging and processing functions and to configure this separate processing device to communicate with a control system associated with the automatic milking system, such that the milking parameters can be manipulated based on the results of the processing of the thermal images.

The invention is based on the insight that mastitis, or even subclinical mastitis, can be detected as an increase in surface temperature of the udder or part thereof. For example, an increase in surface temperature in the order of about 0.5° C. may indicate that subclinical mastitis is at hand. Modern digital thermal imaging devices are capable of detecting even smaller variations in temperature.

The invention is further based on the insight that mastitis, and in particular subclinical mastitis, may be treated by e.g. milking the animal more frequently, or by milking the animal for a longer time period, such that the udder is properly emptied. Hence, the use of antibiotics may be reduced, as may the suffering of the animals.

The processing device is either arranged to receive a user input setting or modifying at least one of said milking parameters in response to said status indication, or the processing device is arranged to selectively set or modify at least one of said milking parameters in response to said status indication.

The expression "selectively modify" is understood to mean that the set of milking parameters is modified only if a certain comparison result is obtained.

Hence, the processing device may be arranged to set of modify the milking parameters in accordance with a predetermined set of criteria.

The processing device may be arranged to provide said status indication if said temperature difference exceeds a predetermined value.

For example, the processing device may be arranged to provide said status indication if said temperature difference exceeds said predetermined value over a sufficiently large portion of those parts of the current thermal image and the reference thermal image which are being compared.

The set of milking parameters may comprise at least one of a milking macro frequency, a milking micro frequency, a milking time and a milking vacuum level, milk handling and milk processing.

A "milking macro frequency" is understood to mean a frequency of milking sessions for that animal.

A "milking micro frequency" is understood to mean a frequency of compressions or vacuum applications applied to a teat during a milking session.

The term "milk handling" is understood to mean the handling of the milk, such as sending it to a separate container in the event that the animal is suspected of having mastitis, or initiating a further test of the milk, such as a cell count or cell identification test.

The term "milk processing" is understood to mean the treatment of the milk, such as by heat, chemicals, UV light, etc.

The processing device may be arranged to increase a milking macro frequency, increase a milking time and/or increase a milking vacuum level in response to said status indication.

The automatic milking system may have means for detecting a position of the udder or a part thereof, and the system may further comprise means for positioning and/or orientating the thermal imaging device in response said position.

The system may comprise first and second thermal imaging devices, configured for generating first and second current thermal images, respectively, of substantially different portions of the udder, and the processing device may be arranged for comparing the first and second current thermal images with first and second reference thermal images, respectively.

According to a second aspect, there is provided a method for controlling an automatic milking system, which is arranged for automatically receiving, identifying and selectively milking a lactating animal in accordance with a set of milking parameters associated with said animal. The method comprises steps of acquiring at least one current thermal image of at least a portion of the animal's udder; comparing at least one current value derived from the at least one current thermal image and/or the at least one current thermal image with at least one reference value derived from at least one reference thermal image of the animal's udder and/or said at least one reference thermal image of the animal's udder, and selectively providing a status indication of said animal in response to a result of said comparing step. The comparing step comprises detecting a temperature difference between the udder as depicted on said current thermal image and the udder as depicted on said reference thermal image. And the status indication is provided in response to the detection.

The comparing step may comprise detecting a temperature difference between said current thermal image and said reference thermal image, and the modifying step comprises increasing a milking macro frequency, increasing a milking time, increasing a milking vacuum level, providing a specific handling of the milk of that animal and providing a specific treatment of the milk of that animal, if said temperature difference exceeds a predetermined value.

The method further comprises either receiving user input, setting or modifying at least one of said milking parameters in response to said status indication, or selectively setting or modifying at least one of said milking parameters in response to said status indication.

The method may further comprise detecting a position and/or orientation of the udder and adjusting a position and/or orientation of the thermal imaging device in response to said position and/or orientation or the udder.

The method may further comprise acquiring first and second current thermal images of substantially different portions of the udder, and comparing the first and second current thermal images with first and second reference thermal images, respectively.

The method may further comprise selectively providing a user alarm in response to a result of said comparing step.

The expression "selectively providing a user alarm" means providing an alarm only if a predetermined condition is met.

The method may comprise identifying at least two udder quarters and wherein the comparing step is performed for each of the detected udder quarters. Hence, each quarter of the udder may be analyzed separately, thus providing an option for setting different milking parameters for different udder quarters.

The acquiring step may comprise acquiring a series of current thermal images, and at least one of selecting one or more current thermal images from said series of current thermal images for use in the comparing step, and merging one or more current thermal images from said series of current thermal images to form a merged current thermal image for use in the comparing step.

DESCRIPTION OF EMBODIMENTS

Figure 1:
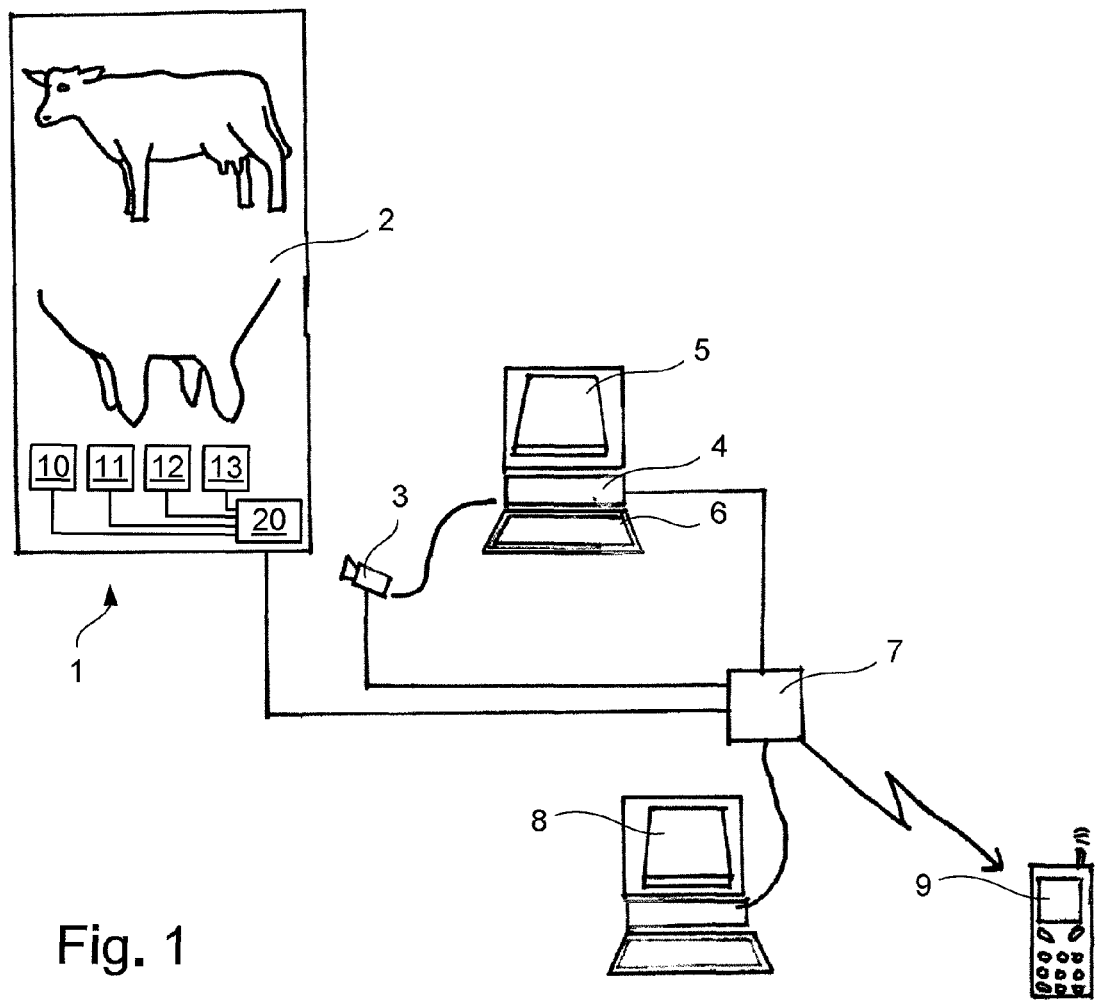
FIG. 1 is a schematic diagram of a system for controlling an automatic milking system.

FIG. 1 schematically illustrates a system 1 for controlling an automatic milking system 2. The system 1 comprises a thermal imaging device 3, a storage device 4, a presentation device 5, a user input device 6, a processing device 7, a remote unit 8, 9. The system further comprises an identification device 10 for identifying each animal, and a localization device 11 for localizing the position of the animal's teats.

The thermal imaging device is arranged for collecting thermal images of the animal's udder, based on which it is possible to analyze blood flow and determine an inflammation status.

The automatic milking system 2 includes a milking device, which animals enter to be milked. Various automatic milking systems are known. The automatic milking system comprises one or more controllers 20, which control the operation of the automatic milking system. For example, the controller(s) may control which animals are allowed to access the milking device 2, and it may control the milking process itself.

The controller or controllers may thus receive information from one or more identification devices 10 arranged at one or more positions; it may control gates (not shown), which allow or prevent an identified animal to enter a milking station; it may receive sensor data from the localization device 11, based on which the positions of the teats are determined, it may control a robot arm 12, which is arranged to automatically apply the teat-cups of the milking device to the teats of an animal present in the milking system; it may control actuators (e.g. vacuum pumps) which provide the actual milking action in the systems; it may control transportation devices which cause the milk to be transported from the milking station to e.g. a storage tank; and it may control diagnosis equipment arranged for determining milk quality.

Furthermore, the control of the automatic milking system may be based on a plurality of milking parameters, which may be individual for each animal. Such milking parameters may include one or more of e.g. milking duration, milking frequency, target amount of milk, vacuum level on milking and vacuum application frequency when milking.

The thermal imaging device 3 may include one or several infrared cameras, which may be installed inside or outside the automatic milking system, e.g. at or near the milking station and preferably arranged on one or both sides of the animal and pointing slightly upwardly towards a position where the udder can be expected to appear before or during the milking.

The thermal imaging device 3 may be connected to a storage device 4, where thermal images are sent and stored for immediate or later analysis by the processing device 7. The thermal imaging device 3 can either be activated all the time or be activated when a certain event occurs such as an animal entering the milking device 2.

The thermal imaging device 3 can thus be used to;

Detect individual animals, e.g. by detecting a code from a tag attached to the animal.

Detect the position of the animal's teats, e.g. utilizing at least two images of the teats from at least two well known positions. This can be realized by a moving camera or by more than one camera located at two different well known positions.

Detect an area (or point) of increased temperature when the animal shows no specific pain or signs. This is referred to as subclinical inflammation i.e. subclinical mastitis which can be detected for example during the milking process.

Hence, the thermal imaging device may replace and/or complement the identification device 10 and the localization device 11.

The storage device 4 may form part of a computer, which may also include an output device, such as a screen 5 for displaying information to a user and a user input device, for example a keyboard 6. The storage device 4 may hold a database containing information about the herd of animals being handled by the automatic milking system.

Information of interest for the user may include for example the temperature interval of each individual animal. An increase above the individual's normal temperature interval may indicate a development of inflammation for example mastitis.

The processing device 7 may be connected to the storage device 4 that holds the thermal images. From the stored data the processing device 7 provides individual spatiotemporal measurement, analysis, modeling, prediction, comparison and classification of the animal heat patterns, representing blood flows that may indicate health problems.

The term "spatial" refers to analyzing heat patterns and variations in every image, whereas the term "temporal" refers to analyzing events over time. Individual heat patterns may be related to the amount of hair present on the udder as well as the variation of hair growth on the selected skin area. If the animal present in the milking device 2 has a hairy udder, the analysis may be based on different statistical measurements for example mean, median, standard deviation and/or maximum temperature of the selected skin area of the animal's udder.

The modeling may include the effects of individual and/or environmental parameters, such as lactation phase, weather and climatic conditions, stress levels, nutrition and water intake, any form of treatment etc.

The prediction may be what can be expected from the next measurement assuming that the animal is healthy or sick, with regards to previous actions such as treatments.

The comparison between the last measurement and the last prediction constitutes the basis of the classification, which involves assigning the animal different health status. The health status may be healthy, possibly ill (can lead to special care and/or observation and/or early action), confirmed subclinical mastitis, diagnosed mastitis etc. The processing device 7 may include a software platform and/or a graphical programming environment such as LabVIEW (Laboratory Virtual Instrumentation Engineering Workbench).

Although in FIG. 1, the processing device 7 is shown as a separate device, in an alternative embodiment the processing device 7 or the features of the processing device 7 can be integrated with the storage device 4.

The remote unit 8, 9 can be located anywhere. The remote unit may be in the form of a bidirectional remote control such as a computer 8 or a portable mobile phone 9. The communication may be sent through e.g. broad band connections, not shown, such as fiber, satellite, LAN (Virtual Local Area Network), radio or ADSL (asymmetrical digital subscriber line) etc.

The user and/or the operator may then regardless of where he or she is see what is going on and take decision upon what actions should be taken. The operator may through a suitable message at the operators console providing the user with instructions, i.e. increase the milking frequency for animals in danger of developing mastitis.

Figure 2:
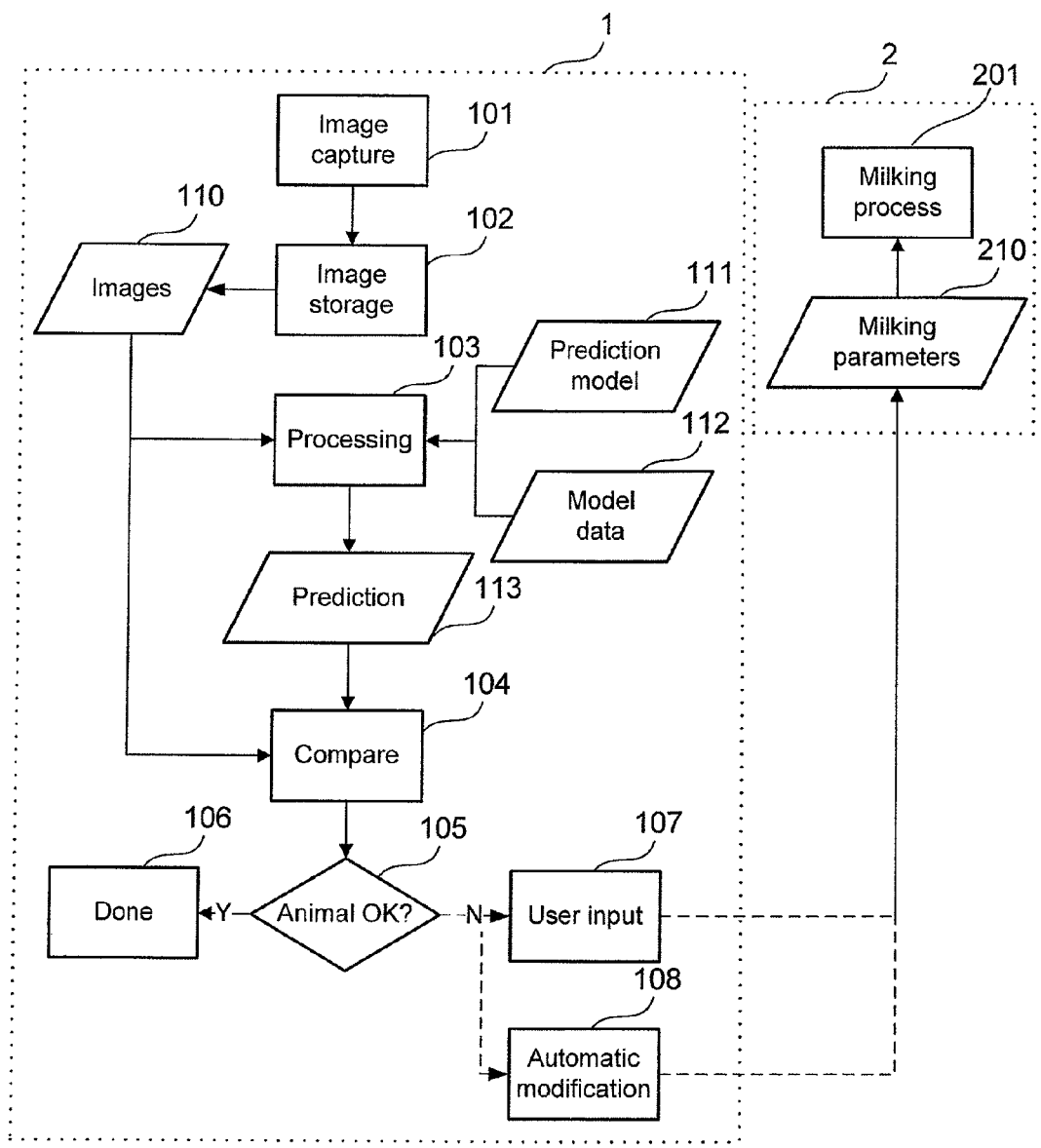
FIG. 2 is a schematic flow chart of a method for controlling an automatic milking system.

An embodiment of the method will now be described with reference to FIG. 2. The method is typically initiated when an animal has been received at a milking station in an automatic milking system. However, it is understood that the method may also be used at e.g. a specialized scanning station or health check station.

In step 101, one or more thermal images are captured, each image depicting at least a part of an animal's udder.

In step 102 the captured images are stored in a storage device 110.

In step 103, a processing is carried out based on the stored images, a prediction model 111 and related model data 112. Step 103 is aimed at providing a prediction, which is used as an input for the comparing step 104.

The prediction 113 may be composed of one or more prediction values or even an array of values, such as a predicted image. Each prediction value may be provided based on e.g. temperature readings of corresponding portions of a predetermined number of earlier images from the storage device, and adjusted for various individual or environmental factors (model data 112), as mentioned above.

In step 104, the current image (which may be received from the storage device 110) is processed to obtain one or more current values or even an array of current values. These values are compared to corresponding values of the prediction 113.

Based on the comparison, it is possible to identify a point or an area of the current image, which presents the greatest difference compared to the prediction. For example, such points or areas may be selected on the udder, near the transition to the teats, or on the teats themselves.

This point or area may then be further analyzed, e.g. by comparison between the current image and one or more earlier images.

The comparison may be based on one or more images. For example, it is possible to acquire a series of images, e.g. while the animal passes the thermal imaging device. From this series of images, it is possible to select the best images for further analysis. As an alternative, it is possible to merge two or more images to form a merged image, which is then used for further analysis. The image or images may be subjected to image processing to make them sharper or to identify objects in the images, based on which the areas of analysis may be selected.

Based on the comparisons it may then be determined 105 whether the animal is likely to be at good health or whether it has an increased likelihood of being at bad health.

In the first case 106, it may be decided not to take any further action. In the alternative, it is possible to e.g. make a note in an animal's log.

In the second case, an indication may be provided to a user 107 and/or to the system 108 to initiate further actions.

An indication to a user may prompt 107 the user to e.g. set or modify the milking parameters 210, but may also call the user's attention to other possible measures, such as application of blood circulation increasing ointment or liniment; hormone treatment (e.g. oxytocin); massage treatment; electro therapeutic treatment; or alerting a vet, etc.

An indication to the system may cause the system to, automatically modify 108 the milking parameters 210, or to provide a suggested modification of milking parameters for approval by an operator.

In both cases 107, 108, the extent of the measures taken or suggested may be made depend on the severity of the differences noted during the comparing step 104.

The action to be taken may also include the handling and/or treatment of the milk derived from an animal, or even from an udder quarter of the animal. For example, milk from an udder or udder quarter suspected of e.g. mastitis, may be separated from the normal milk, and subjected to e.g. further analysis (cell count and/or cell type identification), separate treatment such as heat treatment, chemical treatment, UV treatment, ultrasound treatment, or separate use, such as for feed to calves instead of human consumption. Such suspected milk may typically be led to a different storage container, which may be specific for a "grade" of milk or merely an intermediate container storage while further analysis is being performed.

The teats may be detected using one or several infrared imaging devices, which photograph the teats. The images may then be analysed by the processing device 7. The analysis may include the following steps; association and triangulation. An association between the teats in the two images has to be established. Several methods are available. Elastic matching utilising an approximate model of the udder and teats together with modelling the perspective imaging may be applied. The position of each teat is determined by triangulation using two or more thermal devices having calibrated geometric properties. Processing device 7 may be used for the calculation.

It is noted that the reference and current images may be used either directly for the comparison, or that one or both may be processed before the comparison, such that the actual comparison is based on one or more derived values.

In one embodiment, the comparison (step 104) is performed based on values derived from one or more reference images and values derived from one or more current images.

In another embodiment, the comparison (step 104) is performed based on values derived from one or more reference images and one or more current images.

In yet another embodiment, the comparison (step 104) is performed based on one or more reference images and values derived from one or more current images.

In yet another embodiment, the comparison (step 104) is performed based on one or more reference images and one or more current images.

In further embodiments, it is possible to make the comparison based on e.g. both the current image(s) and one or more values derived from it and both the reference image(s) and one or more values derived from it.

Finally, it is noted that the comparison may be performed with some statistic "filter", such that a certain criterion must be met in order for the status indication to be provided. Such filters may be designed or tuned to provide suitable tolerances for healthy animals being deemed unhealthy and vice versa.

The invention claimed is:

1. A system for controlling an automatic milking system, configured for automatically receiving, identifying and selectively milking a lactating animal in accordance with a set of milking parameters associated with said animal, said system comprising:
a thermal imaging device, configured for generating at least one current thermal image of at least a portion of an udder of said animal,
a storage device, configured for storing at least one reference thermal image of said udder, and
a processing device, configured for comparing at least one current value derived from said at least one current thermal image and/or at least one current thermal image with at least one reference value derived from said at least one reference thermal image and/or at least one reference thermal image,
wherein the processing device is arranged to detect a temperature difference between the udder as depicted on the current thermal image and the udder as depicted on the reference thermal image,
wherein said processing device is arranged to selectively provide a status indication of said animal in response to a result of said detection
wherein the processing device is arranged
to receive a user input setting or modifying at least one of said milking parameters in response to said status indication, or
to selectively set or modify at least one of said milking parameters in response to said status indication; and
wherein said set of milking parameters comprise at least one of a milking macro frequency, a milking micro frequency, a milking time, a milking vacuum level, milk handling and milk treatment.

2. The system as claimed in claim 1, wherein the processing device is arranged to provide said status indication if said temperature difference exceeds a predetermined value.

3. The system as claimed in claim 1, wherein the processing device is arranged to provide said status indication if said temperature difference exceeds said predetermined value over a sufficiently large portion of those parts of the current thermal image and the reference thermal image which are being compared.

4. The system as claimed in claim 1, wherein said processing device is arranged to increase a milking macro frequency, increase a milking time and/or increase a milking vacuum level in response to said status indication, to provide a specific milk handling and/or to provide a specific milk treatment.

5. The system as claimed in claim 1, wherein the automatic milking system has means for detecting a position of the udder or a part thereof, and wherein the system further comprises means for positioning and/or orientating the thermal imaging device in response said position.

6. The system as claimed in claim 1,
wherein the system comprises first and second thermal imaging devices, configured for generating first and second current thermal images, respectively, of substantially different portions of the udder, and
wherein the processing device is arranged for comparing the first and second current thermal images with first and second reference thermal images, respectively.

7. A method for controlling an automatic milking system, which is arranged for automatically receiving, identifying and selectively milking a lactating animal in accordance with a set of milking parameters associated with said animal, the method comprising steps of:
acquiring at least one current thermal image of at least a portion of the animal's udder;
comparing at least one current value derived from the at least one current thermal image and/or the at least one current thermal image with at least one reference value derived from at least one reference thermal image of the animal's udder and/or at least one reference thermal image of the animal's udder,
wherein said comparing step comprises detecting a temperature difference between the udder as depicted on said current thermal image and the udder as depicted on said reference thermal image,
selectively providing a status indication of said animal in response to a result of said detecting, and
receiving a user input setting or modifying at least one of said milking parameters in response to said status indication, or
selectively setting or modifying at least one of said milking parameters in response to said status indication;
wherein said setting or modifying of said milking parameters comprises at least one of increasing a milking macro frequency, increasing a milking time, increasing a milking vacuum level, providing a specific handling of the milk of that animal and providing a specific treatment of the milk of that animal, if said temperature difference exceeds a predetermined value.

8. The method as claimed in claim 7, comprising detecting a position and/or orientation of the udder and adjusting a position and/or orientation of the thermal imaging device in response to said position and/or orientation or the udder.

9. The method as claimed in claim 4, comprising acquiring first and second current thermal images of substantially different portions of the udder, and
comparing the first and second current thermal images with first and second reference thermal images, respectively.

10. The method as claimed in claim 7, further comprising selectively providing a user alarm in response to a result of said comparing step.

11. The method as claimed in claim 7, further comprising identifying at least two udder quarters and wherein the comparing step is performed for each of the detected udder quarters.

12. The method as claimed in claim 7, wherein said acquiring step comprises acquiring a series of current thermal images, and at least one of:
selecting one or more current thermal images from said series of current thermal images for use in the comparing step, and
merging one or more current thermal images from said series of current thermal images to form a merged current thermal image for use in the comparing step.

* * * * *